United States Patent
Schwarzenthal et al.

(10) Patent No.: US 6,634,985 B2
(45) Date of Patent: Oct. 21, 2003

(54) METHOD FOR CONTROL OF AN INTERNAL COMBUSTION ENGINE WITH A VARIABLE VALVE CONTROL

(75) Inventors: Dietmar Schwarzenthal, Ditzingen (DE); Armin Hassdenteufel, Unterriexingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/937,699
(22) PCT Filed: Jan. 18, 2001
(86) PCT No.: PCT/DE01/00203
§ 371 (c)(1),
(2), (4) Date: Jan. 10, 2002
(87) PCT Pub. No.: WO01/55572
PCT Pub. Date: Aug. 2, 2001

(65) Prior Publication Data
US 2002/0155921 A1 Oct. 24, 2002

(30) Foreign Application Priority Data
Jan. 29, 2000 (DE) .......................... 100 03 944

(51) Int. Cl.$^7$ .............................................. B60K 41/06
(52) U.S. Cl. ...................................................... 477/107
(58) Field of Search ............................ 477/90, 107, 110, 477/111

(56) References Cited

U.S. PATENT DOCUMENTS

| | | | |
|---|---|---|---|
| 4,535,732 A | 8/1985 | Nakano et al. | 123/90.16 |
| 5,679,094 A | 10/1997 | Nakamura et al. | 477/111 |
| 6,352,061 B2 * | 3/2002 | Takahashi | 477/107 |

FOREIGN PATENT DOCUMENTS

| | | | |
|---|---|---|---|
| EP | 0420443 | 4/1991 | |
| EP | 0562561 | 9/1993 | |
| JP | 3-5248 | * 1/1991 | 477/110 |
| JP | 2001-214768 | * 8/2001 | |

* cited by examiner

Primary Examiner—Sherry Estremsky
(74) Attorney, Agent, or Firm—Crowell & Moring LLP

(57) ABSTRACT

A process for controlling an internal combustion engine, whereby the internal combustion engine is equipped with a device to change a valve timing. To permit a change in the valve timing only when it is necessary for the operation of the internal combustion engine, a transmission, connected at the end of the internal combustion engine, is monitored as to whether a shift operation is taking place in the transmission. If such a shift operation is recognized, a change in the valve timing is suppressed.

8 Claims, 2 Drawing Sheets

METHOD FOR CONTROL OF AN INTERNAL COMBUSTION ENGINE WITH A VARIABLE VALVE CONTROL

SUMMARY OF THE INVENTION

This application claims the priority of PCT International No. PCT/DE01/00203, filed Jan. 18, 2001, and German Patent Document 100 03 944.8 filed Jan. 29, 2000 the disclosures of which are expressly incorporated by reference herein.

The invention relates to a process for the control of an internal combustion engine, whereby the internal combustion engine is equipped with a device to change a valve timing. A change in the valve timing means in this connection that variables of the valve timing, such as valve lift or phase position, can be adjusted by means of well-known means.

In such devices a change in the valve timing takes place as a function of the different operating parameters of the internal combustion engine. Such an operating parameter can be, for example, the actual load of the internal combustion engine. One possibility of detecting such a load is to scan the position of a throttle flap of the internal combustion engine. In particular in devices to change the valve timing, in which the valve timing is not adjusted continuously, but in steps, a change in the load of the internal combustion engine results in a change in the valve timing, when a load threshold, determined for the change over between steps, is exceeded. If the load of the internal combustion engine changes often in the area of the load threshold, the result is frequent shift operations in the valve timing, and thus an increased wear and under some circumstances also an unsatisfactory operating performance of the internal combustion engine.

Proceeding from this state of the art, the object of the invention is to provide a process to control an internal combustion engine with variable valve timing, in which a change in the valve timing takes place only when it is necessary for the operation of the internal combustion engine.

The invention solves this problem and is based on the knowledge that a change in the load of the internal combustion engine takes place especially when there is a shift operation in the transmission, connected at the end of the internal combustion engine. Therefore, according to the present invention the transmission, connected at the end of the internal combustion engine, is monitored as to whether there is a shift operation in the transmission. If such a shift operation is recognized, a change in the valve timing is suppressed. With this process the number of changes in the valve timing is significantly reduced in an advantageous manner and thus the wear properties of the valve timing and optionally the operating behavior of the internal combustion engine are improved, as a result during a shift operation in the transmission the performance characteristics of the internal combustion engine are not additionally affected by a change in the valve timing.

Thus, to recognize a shift operation in a manual transmission, a clutch be monitored and in the case of an open clutch a shift operation included such a monitoring can be performed, for example, in a very simple manner by scanning a clutch switch on the clutch pedal. In particular for a manual transmission the change in the load of the internal combustion engine is especially high, because here for a shift operation the load of the internal combustion engine is reduced to zero. In the case of an automatic transmission a shift operation can be recognized because a controller of the automatic transmission sends a signal, when this controller triggers a shift operation. Such a signal can be especially easy to generate and passed on, when the controller of the automatic transmission is connected to a controller for the valve timing by way of a databus, for example a CAN bus.

A shift operation can be recognized totally independent of the design of the transmission, in that a wheel speed signal is related to a motor speed signal. Should this relation change, then a shift operation has taken place, or the force flow between the internal combustion engine and the wheels of the motor vehicle has been interrupted in a different manner. This process can be implemented in a very simple manner, because the wheel speed signals are already detected in all motor vehicles as the driving speed signal or for an antilock braking system.

Finally it can be provided that after a recognized shift operation a change in the valve timing be suppressed for a predetermined period of time (i.e. a dead time), which follows immediately, in order to prevent in this manner that a load adjustment after a shift operation result in a change in the valve timing.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
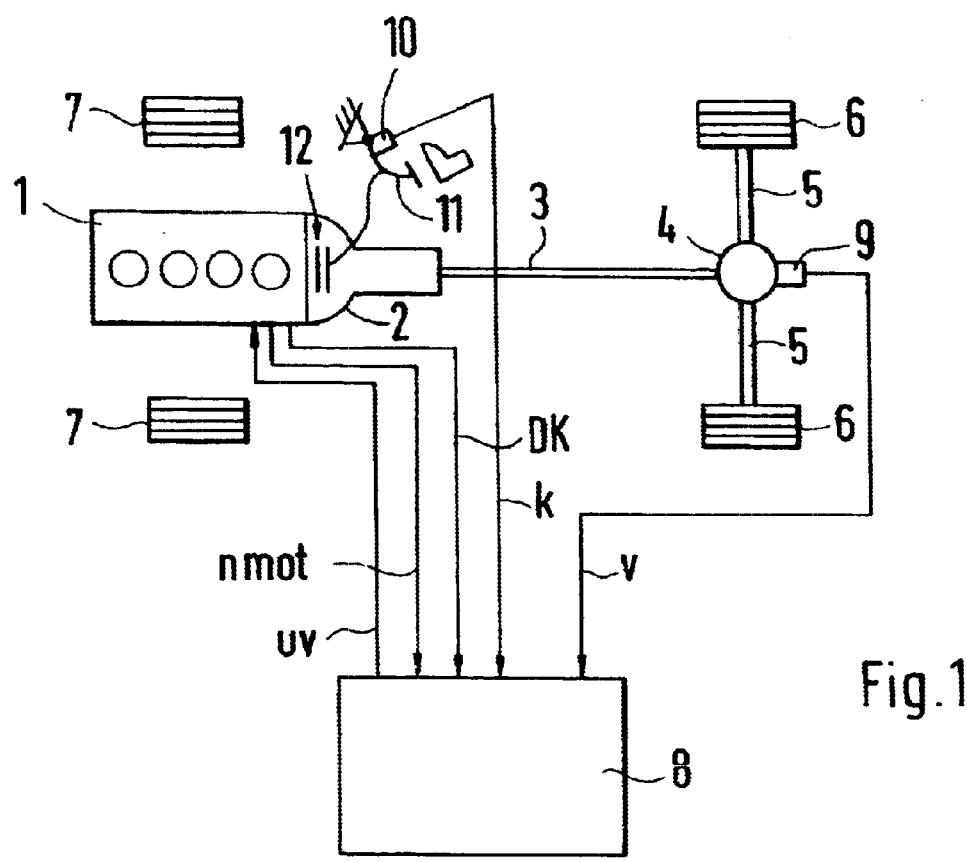
FIG. 1 is drawing of a drive train of a motor vehicle, with a manual transmission.

The drive train, depicted in FIG. 1, for a motor vehicle comprises an internal combustion engine 1, a manual transmission 2, which is connected at the end of the internal combustion engine 1, a cardan shaft 3 to connect the transmission 2 to a differential 4, and two articulated shafts 5, which connect the differential 4 to the driven wheels 6. The two other wheels 7 are not driven. A controller 8 receives, as the operating variables from the internal combustion engine 1, a signal DK for the throttle flap position and thus for the load of the internal combustion engine 1. In addition, the controller 8 receives from the internal combustion engine 1 a signal $n_{mot}$ for the speed of the internal combustion engine 1.

The internal combustion engine 1 is equipped with a variable valve timing, as disclosed in detail, for example, in German Patent DE 40 06 910 A1 (=U.S. Pat. No. 5,120,278). The controller 8 controls this device to change the valve timing by way of a signal uv in such a manner that at the value of the signal uv=0 a first phase position in the valve timing is set and at a signal uv=1 a second phase position in the valve timing is set.

Finally the controller 8 receives a signal of a driving speed v of the motor vehicle from a signal generator 9 and the signal k of a clutch switch 10, which monitors the position of a clutch pedal 11. The clutch pedal 11 actuates a clutch 12, disposed in the transmission 2.

The arrangement of the signal generator 9 at the differential 4 has the effect that the signal v for the driving speed is determined as the mean value of the wheel speeds of the driven wheels 6.

Figure 2:
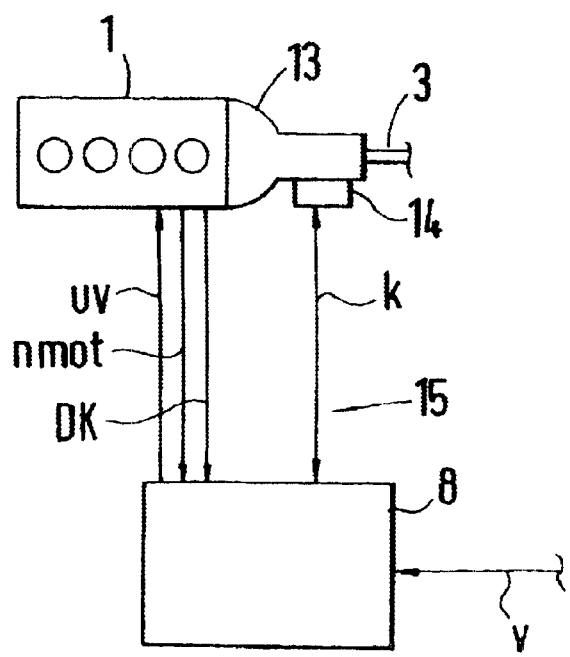
FIG. 2 is a detail of the drawing, according to FIG. 1, but for an automatic transmission.

FIG. 2 is a detail of the drawing, according to FIG. 1, of a drive train with an automatic transmission 13. An automatic transmission means, in this content that the force flow in the transmission 13 is not interrupted by the driver and a clutch pedal 11, but rather by means of a controller 14 of the automatic transmission 13. The rest of the construction of the automatic transmission 13 is immaterial.

The signal connections between the controller 8 and the internal combustion engine 1 are unchanged with respect to FIG. 1. The signal k from the clutch switch 10 is replaced here by a signal k for a shift operation, which is exchanged by way of a CAN databus between the controller 8 and the control 14 of the automatic transmission 13. The rest of the drive train is unchanged with respect to FIG. 1.

Figure 3:
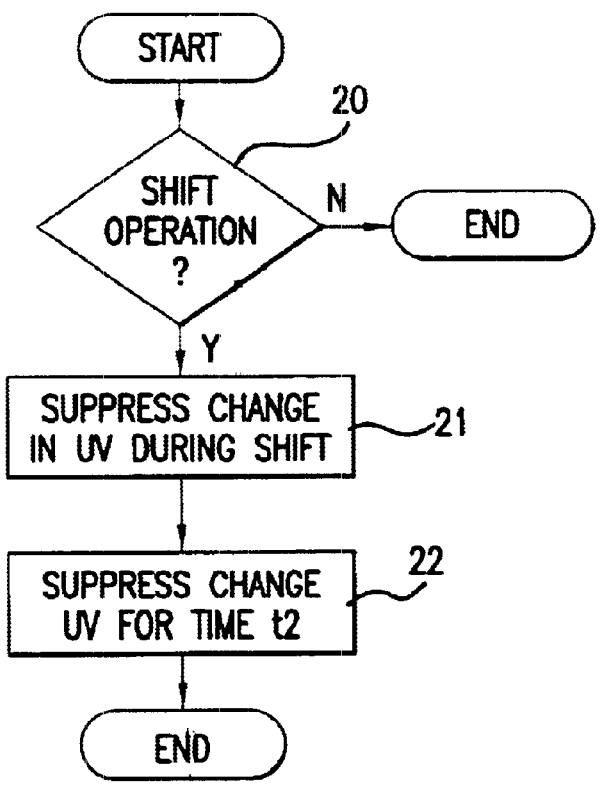
FIG. 3 is a flow diagram of an inventive process to control an internal combustion engine.

FIG. 3 is a flow chart of a (sub) routine in the controller 8. In a first step 20 the transmission 2 or the automatic transmission 13 is monitored as to whether a shift operation is taking place in the transmission. If such a shift operation is recognized, the program continues with the next step 21, wherein a change in the signal uv is suppressed for the duration of the shift operation. Immediately following step 21, a change in the signal uv is further suppressed for an additional period of time tz in a step 22. This period of time tz is dimensioned in such a manner that changes in the signal DK, and thus the load of the internal combustion engine 1, which is connected to the shift operation in the transmission 2, 13 that has just finished, occur in this period of time tz. When this period of time tz has expired, or if no shift operation was recognized in step 20, the program is finished, and the controller 8 passes over to other parts of the program, which are not illustrated here.

Figure 4:
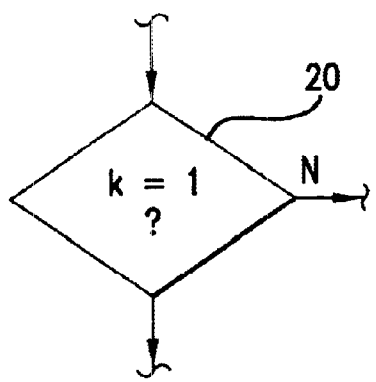
FIG. 4 depicts a process to recognize a shift operation for the process, according to FIG. 3.

FIG. 4 shows a first possibility to recognize a shift operation in step 20. To this end, it is tested whether the signal k assumes the value 1. If this is the case, then the program branches off to step 21. Otherwise, the program is terminated, according to FIG. 3. The signal k assumes the value 1 in the following cases:

In the case of a manual transmission 2, according to FIG. 1, when the clutch pedal 11 is moved out of its idle position and thus a separation of the clutch 12 is introduced; or In the case of an automatic transmission 13, according to FIG. 2, as long as the control 14 performs a shift operation in the transmission 13.

Figure 5:
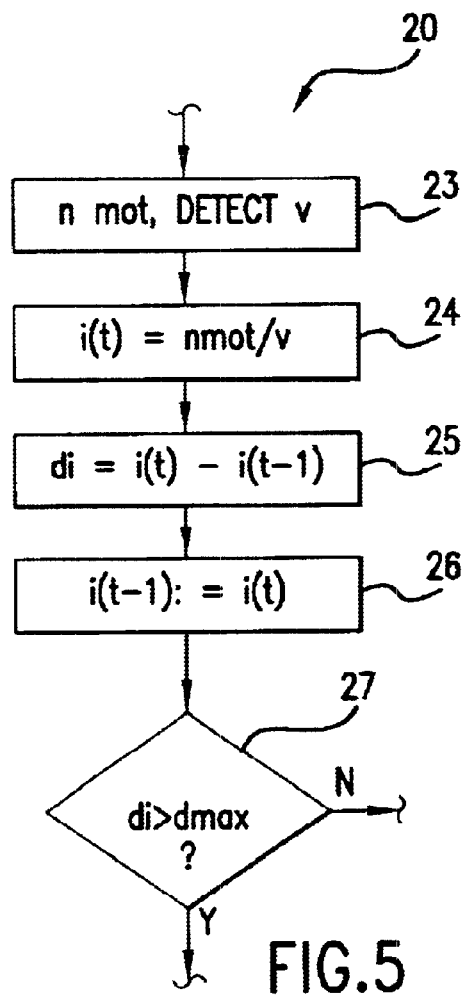
FIG. 5 depicts an alternative process to recognize a shift operation for the process, according to FIG. 3.

FIG. 5 shows an alternative process for recognizing a shift operation in step 20. First, in a step 23 the signals $n_{mot}$ for a speed of the internal combustion engine 1 and v for a driving speed are detected. In a subsequent step 24 a relation i(t) of the signals $n_{mot}$ and v is formed. In a step 25 a deviation di of the actual relation i(t) to a predetermined relation i(t−1) is calculated. In a subsequent step 26 the actual relation i(t) is stored as the preceding relation i(t−1). In a step 27 it is tested whether the amount of the deviation is above a maximum value $d_{max}$. If this is the case, then a shift operation is recognized and the program branches off to step 21. Otherwise, the program ends in accordance with FIG. 3.

The maximum value $d_{max}$ for the amount of deviation di indicates a reliable deviation that does not yet point to a shift operation or any other operation having an additional effect on the load of the internal combustion engine 1. In the case of a manual transmission 2 the maximum value $d_{max}$ can assume a value of essentially zero. In an automatic transmission 13 the maximum value must be taken into consideration as a function of the model so that a change in the relation i(t) can be induced even outside a shift operation. For example, this can be the case when the automatic transmission 13 is provided with a hydraulic torque converter on the input side. By selecting the size of the maximum value $d_{max}$ it can be determined in this case whether, for example, a slip in the said torque converter to suppress the change in the valve timing should or should not take place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for the control of an internal combustion engine, whereby the internal combustion engine is equipped with a device to change a valve timing, said process comprising the steps of:

monitoring a transmission, which is connected at the end of the internal combustion engine, as to whether a shift operation is taking place in the transmission, and suppressing a change in the valve timing, when a shift operation is recognized.

2. The process, as claimed in claim 1, which, in order to recognize a shift operation in the case of a manual transmission, a clutch is monitored, and, in the case of an open clutch a shift operation is concluded.

3. The process, as claimed in claim 2 wherein after a recognized shift operation, a change in the valve timing is further suppressed for a predetermined immediately following period of time (tz).

4. The process, as claimed in claim 1, to recognize a shift operation in the case of an automatic transmission a signal (k) is sent from a controller of the automatic transmission, when the controller triggers a shift operation.

5. The process, as claimed in claim 4 wherein after a recognized shift operation, a change in the valve timing is further suppressed for a predetermined immediately following period of time (tz).

6. The process, as claimed in claim 1, wherein, in order to recognize a shift operation, a wheel speed signal (v) is put into relationship (di) to a motor speed signal ($n_{mot}$), and if there is a change in the relation, a shift operation is recognized.

7. The process, as claimed in claim 6 wherein after a recognized shift operation, a change in the valve timing is further suppressed for a predetermined immediately following period of time (tz).

8. The process, as claimed in claim 1 wherein after a recognized shift operation, a change in the valve timing is further suppressed for a predetermined immediately following period of time (tz).

* * * * *